US007346545B2

(12) United States Patent
Jones

(10) Patent No.: US 7,346,545 B2
(45) Date of Patent: Mar. 18, 2008

(54) METHOD AND SYSTEM FOR PAYMENT OF INTELLECTUAL PROPERTY ROYALTIES BY INTERPOSED SPONSOR ON BEHALF OF CONSUMER OVER A TELECOMMUNICATIONS NETWORK

(75) Inventor: Dana Howard Jones, Rancho Palos Verdes, CA (US)

(73) Assignee: Ultramercial, Inc., Palo Verdes, CA (US)

( * ) Notice: Subject to any disclaimer, the term of this patent is extended or adjusted under 35 U.S.C. 154(b) by 624 days.

(21) Appl. No.: 09/867,181

(22) Filed: May 29, 2001

(65) Prior Publication Data
US 2001/0047338 A1    Nov. 29, 2001

Related U.S. Application Data

(60) Provisional application No. 60/207,941, filed on May 27, 2000.

(51) Int. Cl.
*G06Q 30/00* (2006.01)
(52) U.S. Cl. .......................................... 705/26; 705/27
(58) Field of Classification Search ............. 705/26–27
See application file for complete search history.

(56) References Cited

U.S. PATENT DOCUMENTS

| | | | |
|---|---|---|---|
| 5,191,573 A | 3/1993 | Hair | |
| 5,675,734 A | 10/1997 | Hair | |
| 5,774,869 A | 6/1998 | Toader | |
| 5,774,870 A | 6/1998 | Storey | |
| 5,794,210 A * | 8/1998 | Goldhaber et al. ........... 705/14 |
| 5,838,314 A * | 11/1998 | Neel et al. ..................... 725/8 |
| 5,855,008 A | 12/1998 | Goldhaber et al. | |
| 5,991,736 A * | 11/1999 | Ferguson et al. ............. 705/14 |
| 6,084,628 A | 7/2000 | Sawyer | |
| 6,102,406 A | 8/2000 | Miles et al. | |
| 6,119,098 A | 9/2000 | Guyot et al. | |
| 6,128,651 A | 10/2000 | Cezar | |
| 6,141,010 A | 10/2000 | Hoyle | |
| 6,161,127 A | 12/2000 | Cezar et al. | |
| 6,161,142 A | 12/2000 | Wolfe et al. | |
| 6,169,542 B1 | 1/2001 | Hooks et al. | |
| 6,178,446 B1 | 1/2001 | Gerszberg et al. | |
| 6,182,050 B1 | 1/2001 | Ballard | |
| 6,216,112 B1 | 4/2001 | Fuller et al. | |

(Continued)

FOREIGN PATENT DOCUMENTS

EP    0913789 A2 *   5/1999

OTHER PUBLICATIONS

Ebenkamp, Becky; "Gold on that thar Web," Brandweek, Jul. 15, 1996, v37 n29 p. 17, 3 pgs, Proquest #9892249.*
Alexander, Steve; "FREE . . . usualy carry a cost," startribune.com, Jan. 31, 2000; Proquest #48774859, 6 pgs.*

*Primary Examiner*—Robert M. Pond
(74) *Attorney, Agent, or Firm*—Morrison & Foerster LLP

(57) ABSTRACT

The present invention is directed to a method and system for distributing or obtaining products covered by intellectual property over a telecommunications network whereby a consumer may, rather paying for the products, choose to receive such products after viewing and/or interacting with an interposed sponsor's or advertiser's message, wherein the interposed sponsor or advertiser may pay the owner or assignee of the underlying intellectual property associated with the product through an intermediary such as a facilitator.

16 Claims, 3 Drawing Sheets

U.S. PATENT DOCUMENTS

| | | |
|---|---|---|
| 6,216,129 B1 | 4/2001 | Eldering |
| 6,275,854 B1 | 8/2001 | Himmel et al. |
| 6,385,596 B1 * | 5/2002 | Wiser et al. .................. 705/51 |
| 6,529,878 B2 * | 3/2003 | De Rafael et al. ............ 705/14 |
| 6,658,568 B1 * | 12/2003 | Ginter et al. ................ 713/193 |

* cited by examiner

METHOD AND SYSTEM FOR PAYMENT OF INTELLECTUAL PROPERTY ROYALTIES BY INTERPOSED SPONSOR ON BEHALF OF CONSUMER OVER A TELECOMMUNICATIONS NETWORK

CLAIM OF PRIORITY

The present application claims the benefit of U.S. Provisional Application No. 60/207,941, titled "Method and System for Payment of Intellectual Property Royalties by Interposed Sponsor on Behalf of Consumer over A Telecommunications Network," and filed on May 27, 2000.

BACKGROUND OF THE INVENTION

1. Field of Invention

The present invention is directed to a method and system for distributing or obtaining intellectual property products through alternative payment of royalties by interposed sponsor on behalf of consumer via a telecommunications network.

2. Description of Related Art

Intellectual property, including music, literature, visual arts (painting, photography, etc) and motion pictures are protected under the Copyright Act. Certain statutory rights are given to the creators and their assigns, including the right to control the copying or distribution of their creative works.

The advent of the computer and its ability to digitize products protected by intellectual property rights, such as music or writings, have made it possible to make copies of originals without appreciable loss of quality. Recently, the widespread use of the Internet has made it possible to distribute and share intellectual property in its digital form, worldwide, beyond the control of the intellectual property rights holders.

The music industry is particularly affected by this turn of events. An open format for the digitizing of recorded music, MP3, compacts the file size of music to an acceptable size for transfer over a telecommunications network. This MP3 format has significantly changed the way in which popular music is being consumed. The MP3 freeware available today facilitates listening to personalized play lists of individual songs, as opposed to one continuous CD. This freeware allows consumers to transform once-copy-protected audio CD files into MP3 files. Major consumer electronics companies are providing various kinds of MP3 players that can easily download files from personal computers. In one stance, Napster, being totally free, becomes a very attractive site to illegally download copyrighted music.

Moreover, several factors encourage the growing violation of intellectual property using the Internet. First, many young people, typically under the age of 18, have access to the Internet, but do not have a way to pay for items they find on the Internet because they do not have credit or debit cards. At the time of filing the present application, Napster is trying to negotiate a fee-based subscription service with owners or assignees of intellectual property (such as record companies). If this should occur, those under 18 years of age, who cannot purchase easily online will be left out and would continue to seek other means by which to illegally download music or other kinds of product covered by intellectual property Furthermore, people in college, 18 to 24 year olds, have high-speed Internet connections supplied by their schools, making the schools de facto accessories to piracy through the massive downloading of un-paid-for copyrighted music.

Young people are becoming accustomed to getting music for free and have shown little guilt about the fact that they are breaking the law. As a result, copyright holders are losing millions of dollars in royalties, while certain young people with limited cash, but unlimited Internet access and free time, are wrecking havoc on copyrighted intellectual property.

At the same time, advertisers today are facing very unpleasant realities in conventional advertising space. More specifically: 1) the proliferation of cable channels and attendant "channel surfing" during commercials breaks; 2) consumer habits of taping shows and then fast-forwarding through commercials during playback; 3) new hard-disk TV recorders that can scan out commercials. Further, Internet banner ads have hit new lows in responses. Once a 3% click-through rate, they are now, at the time of filing this application, as low as 2 click-throughs per 1,000 impressions. Advertisers are not reaching people as they have been in the past.

U.S. Pat. Nos. 5,675,734 and 5,191,573 disclose Internet downloading of sound files, paid for by credit cards or bank instruments, but does not include method for payment by a sponsor. Meanwhile, although U.S. Pat. No. 5,794,210 teaches "cyber coin" compensation for paying attention to online advertisements and the brokerage of attention, it does not offer a method where an advertiser pays directly for the intellectual property license on behalf of the consumer.

SUMMARY OF THE INVENTION

The preferred embodiments of the present invention offer people a legitimate and cashless way to obtain copyrighted music or other forms of intellectual property, while still delivering a royalty to the intellectual property rights holder.

In accordance with the preferred embodiments of the present invention, a consumer may choose to receive intellectual property products over a telecommunications network after viewing and/or interacting with an interposed sponsor's or advertiser's message, wherein the interposed sponsor or advertiser may pay the holder of the underlying intellectual property either directly or through an intermediary such as a facilitator.

More specifically, in accordance with one embodiment, upon logging on to an Internet web site where intellectual property products, such as musical composition or written articles, are for sale via download, a consumer may choose to obtain the right to download selected intellectual property products ("IP products") by viewing or participating in an advertiser's message or commercial, rather than by paying for the intellectual property products with cash or credit card. In one instance, a consumer may obtain the right to download a musical composition if he or she agrees to first view an advertisement presentation, such as a multimedia video commercial, by an automobile manufacturer, who thereafter pays the royalties to the holder of the intellectual property product on behalf of the consumer.

Several objects and advantages of the present invention include:

a) to provide a "money-less" way for young people (or anyone else) to legitimately obtain copyrighted intellectual property;

b) to provide a legitimate alternative to illegal and pirated practices of obtaining copyrighted intellectual property over a telecommunications network;

c) to provide copyright holders with a legitimate royalty source which is completely accountable;

d) to provide consumers with an assured quality copy of the original source;

e) to provide advertisers with a "captive audience," which may be of a certain demographic profile, for either a specified period of time or for a specified number of responses to advertisers' queries, yet respecting the privacy issues of the consumer;

f) to provide a more democratic business model for copyright holders who do not have major distribution outlets.

DETAILED DESCRIPTION OF THE PREFERRED EMBODIMENT

The embodiments of the present invention shall be described in detail with references to FIGS. 1-4. Although only the preferred embodiments of the present invention will be described hereinafter, it shall be understood that the detailed discussion of preferred embodiments is not intended to limit the present invention to those particular embodiments.

Figure 1:
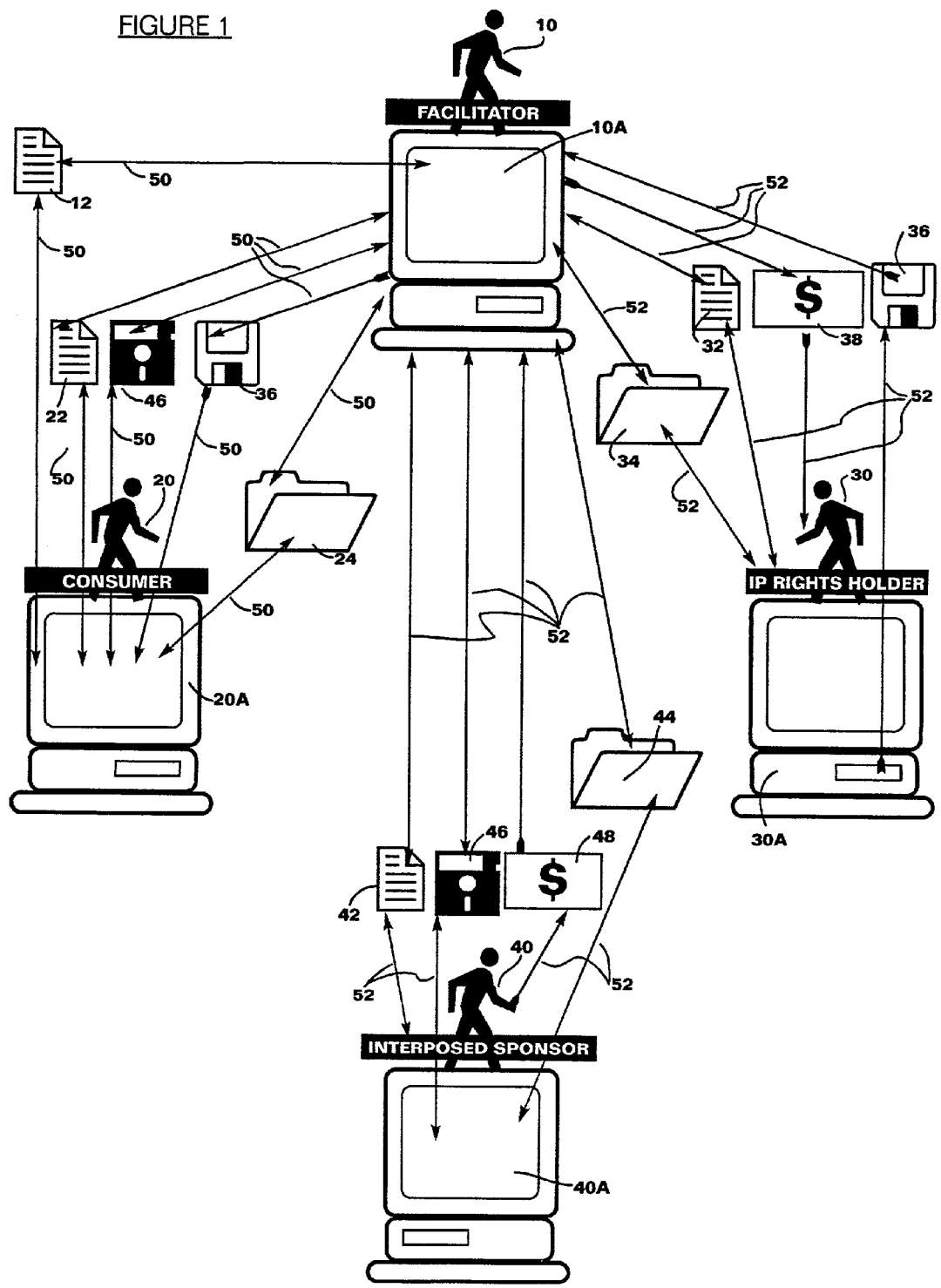
FIG. 1 shows a schematic diagram of a method of obtaining/distributing intellectual property products in accordance with the preferred embodiment of the present invention.

A preferred embodiment of the present invention is illustrated in FIG. 1. In accordance with the preferred embodiment, four principals are preferably present: a facilitator 10, a consumer 20, an intellectual property (IP) rights holder 30, and an interposed sponsor 40. All of the principals preferably communicate over a telecommunications network 50 such as the Internet, using their respective computers: facilitator's computer 10A, consumer's computer 20A, IP rights holder's computer 30A and interposed sponsor's computer 40A. Three of the principals (facilitator, IP rights holder and interposed sponsor) may also communicate through a two-way communications path 52, which may include telephony, facsimile, courier, mail or even person-to-person meetings.

In accordance with the preferred embodiment, facilitator preferably provides consumer with a sign-up agreement 22, followed by a password 12, both preferably over said telecommunications network 50. Further, facilitator transmits to consumer an interposed sponsor message 46 and IP rights holder's IP 36, both also preferably over said telecommunications network 50. It is preferable that the facilitator maintains a consumer use log 24 of activity between facilitator and consumer, which consumer has access to over said telecommunications network 50.

In accordance with the preferred embodiment, the IP rights holder has intellectual property products, such as recorded music, literature, visual arts or motion pictures. The IP rights holder preferably enters into a licensing and fee agreement 32 with facilitator. Facilitator maintains a use log 34 of activity between facilitator and IP rights holder, preferably made available to IP rights holder over said two-way communications path 52. Facilitator preferably pays royalties 38 to IP rights holder.

In accordance with the preferred embodiment, interposed sponsor preferably provides facilitator with access to a message 46, which will be subsequently exhibited to consumer if he or she chooses. In exchange, interposed sponsor pays a fee 48 to facilitator. An interposed sponsor use log 44 is preferably maintained by the facilitator and can be made available to interposed sponsor via two-way communications path 52.

Figure 2:
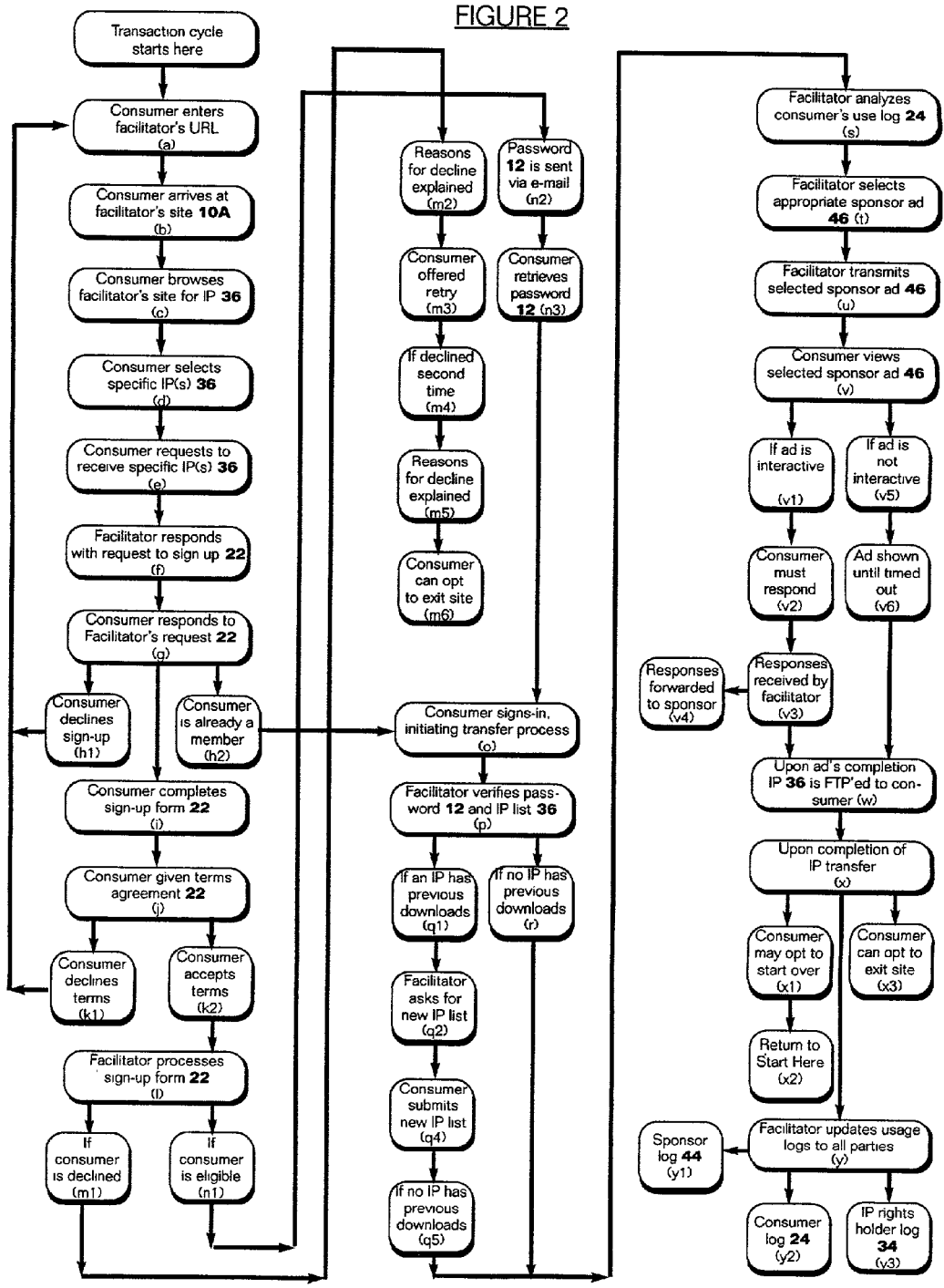
FIG. 2 shows a flow chart of the method of obtaining intellectual property products of FIG. 1 from the consumer's perspective.

In accordance with the preferred embodiment, before consumer 20 initiates a transaction cycle (as shown in FIG. 2), facilitator 10 preferably offers to intellectual property rights holder 30 its venue or site 10A on a telecommunications network 50 to distribute IP rights holder's intellectual property 36. Facilitator and IP rights holder preferably enter into a licensing agreement 32 specifying that royalties 38 will come from monies paid 48 from interposed sponsor 40. Facilitator will then preferably maintain use logs 34 to keep accurate records of the number of transaction cycles a specified IP is a part of, and as to, the royalties due and subsequent payments. In accordance with the preferred embodiment, IP rights holder will be barred from playing the "consumer" in the transaction cycle, preventing IP rights holder from gaining profit at the expense of the interposed sponsor.

Upon completion of above agreement, the IP rights holder provides facilitator with access to the IP products, by either making it available on IP rights holder's computer 30A connected to said telecommunications network, or by sending a copy to reside at facilitator's site 10A. Quality control issues can be addressed at this time, where the best possible original source will be digitized in a manner most suited for distribution of the product over a telecommunications network.

In accordance with the preferred embodiment, facilitator offers to an interposed sponsor 40 a venue or site 10A on a telecommunications network where interposed sponsor may exhibit a message 46 to consumer 20. Facilitator and interposed sponsor enter into an agreement 42 specifying the fee 48 per exhibition of said message, which will be the source of the royalty 38 for the subsequently transferred IP 36 described above. This agreement 42 may also specify which specific IP 36 and the number of its transaction cycles the interposed sponsor will contract for. In this way, the interposed sponsor can "target" consumers most closely associated in demographic terms with said specific IP. Facilitator will provide a use log 44 to the interposed sponsor, accounting for each transaction cycle.

In accordance with the preferred embodiment, facilitator may provide certain safeguards against unwanted use of the transaction cycle: the barring of IP rights holders to use the transaction cycle to generate royalties for themselves; barring of multiple transactions from the same consumer for the same specific IP (preventing "spamming" and/or unwanted duplicate exhibitions of the same message to the same consumer).

Additional agreement specifics include guidelines for the content of the message itself: its compatibility to run on said telecommunications network; its dimensions in pixels; its file size; its duration; the number of queries that preferably require responses from the consumer; consumer privacy issues; community moral standards, review and approval prior to use by facilitator.

Upon completion of above agreement, the interposed sponsor preferably provides facilitator with access to the message, by either making it available on interposed sponsor's computer 40A connected to said telecommunications network, or by sending a copy to reside at facilitator's site 10A.

Consumer's sign-up agreement 22 specifies how consumer may use facilitator's venue/site 10A. Consumer preferably provides facilitator with sufficient identification to satisfy facilitator that said consumer is unique to facilitator's site (protecting the interests of the interposed sponsor by preventing duplicate identities by the same consumer, therefore preventing the exhibition of the same message to the same consumer posing as two or more consumers; preventing IP rights holders from posing as consumer or multiple consumers to unjustly benefit from accumulating royalties through transaction cycles) and to provide country of residency as a further criteria for interposed sponsor. Additionally, consumer preferably accepts to use the obtained IP product in accordance with current copyright laws. Upon a positive determination of the above factors, facilitator issues a unique password 12 to consumer. As previously mentioned, facilitator will maintain a use log 24 for the consumer, accounting for each transaction cycle.

The last two consumer-related items, message 46 and IP 36, are best described in FIG. 2 below, which illustrates the transaction cycle.

FIG. 2 illustrates the preferred embodiment of a complete consumer transaction cycle. In step (a) the consumer uses facilitator's Uniform Resource Locator (URL) within a telecommunications network 50 to reach (b) facilitator's site 10A. In step (c) consumer is given the opportunity to browse though titles and descriptions of any of the intellectual properties 36 that have been licensed to the facilitator from various IP rights holders 30. This process may include a brief sample of the IP to give the consumer an opportunity to evaluate a specific IP prior to selecting it.

In step (d), consumer preferably selects a specific IP, such as a musical composition or a news article, through a link at the facilitator's site. The consumer may make more than one selection at this time, and each selection's identifier can be temporarily stored in a queue for the consumer's ease of completing the transaction cycle.

The consumer then requests to receive the selected IP (e) from the facilitator. The facilitator's site preferably responds with a request (f) to complete a sign-up agreement 22. The reason for placing this request at this point in the process is to insure that the consumer is already involved in the process, having browsed and found at least one IP, and would be less likely to back out of the process when asked for personal information. However, in other embodiments, this sign-up agreement portion could be moved to an earlier point in the complete transaction process.

The consumer responds to above prompt (g). If the consumer declines to complete a sign-up agreement (h1) consumer is then free to exit the site and is offered an opportunity to begin the transaction process anew. If the consumer has previously completed the sign-up agreement (h2) they need only enter their unique password 12 to continue on (see step (o) in FIG. 2).

A consumer who elects to complete the sign-up agreement 22 does so in step (i). Consumer provides facilitator with sufficient identification to satisfy facilitator that said consumer is unique to facilitator's site. Additionally, consumer preferably chooses to accept or decline a use agreement stating that consumer will use IP in accordance with current copyright laws (j). If consumer declines to accept these terms (k1) they are routed back to the starting page (b) and offered another opportunity to begin a transaction cycle. If consumer accepts terms (k2), then facilitator processes consumer's data (l).

Upon a positive determination of the above factors (n1), a unique password 12 is issued by facilitator to consumer (n2). Consumer retrieves password (n3) and proceeds to step (o). If consumer is declined (m1), then reasons for decline are explained (m2) and consumer is offered a retry (m3). If declined a second time (m4), reasons for being declined are again explained (m5) at which time consumer can opt to exit site (m6).

Step (o) is consumer sign-in, where consumer preferably enters unique password 12. Facilitator then verifies password and the titles of the selected IP product 36 (p). If none of the IP product titles have prior transactions with consumer (r), then consumer's transaction moves to step (s). If consumer's IP product has been previously transferred (q1) to same consumer (and if this is a negative stipulation on behalf of interposed sponsor or IP rights holder) then facilitator asks for a new IP or IP product list (q2). Consumer can then browse for new titles and submit new list (q4), and, provided new list has no previous transfers (q5), then consumer proceeds to step (s).

At step (s), facilitator analyzes consumer's use log 24 for a list of previously viewed interposed sponsor messages. After negotiating any possible sponsor prerequisites, facilitator may select appropriate sponsor message 46 (t). In accordance with other embodiments, a sponsor may select the appropriate message. Facilitator then transmits selected interposed sponsor's message to consumer (u). Consumer views selected message (v). If the message is interactive (v1) then consumer preferably responds to any and all prompts (v2). Since consumer privacy issues are paramount, the types of queries will not be personal in nature. However, consumer can decline to respond and can exit transaction cycle at this point (v3). Facilitator receives consumer's responses (v4), and forwards consumer's responses to interposed sponsor (v5) via telecommunications network. If message is not interactive (v6), then it runs until completion on its own or for a fixed duration of time.

Upon completion of sponsor's message, IP product 36 is preferably transferred to consumer via methods or means such as a File Transfer Protocol (FTP) system (w). This will insure that IP file does not begin "streaming" within consumer's browser application and thus not end up residing on consumer's computer hard drive. Upon completion of IP transfer (x), consumer can opt to start a new transaction cycle (x1) by returning to the start page (x2), or consumer can exit site (x3). Facilitator thereafter preferably updates all use logs for all parties (y): sponsor use log 44 (y1), consumer use log 24 (y2) and IP rights holder use log 34 (v3).

Figure 3:
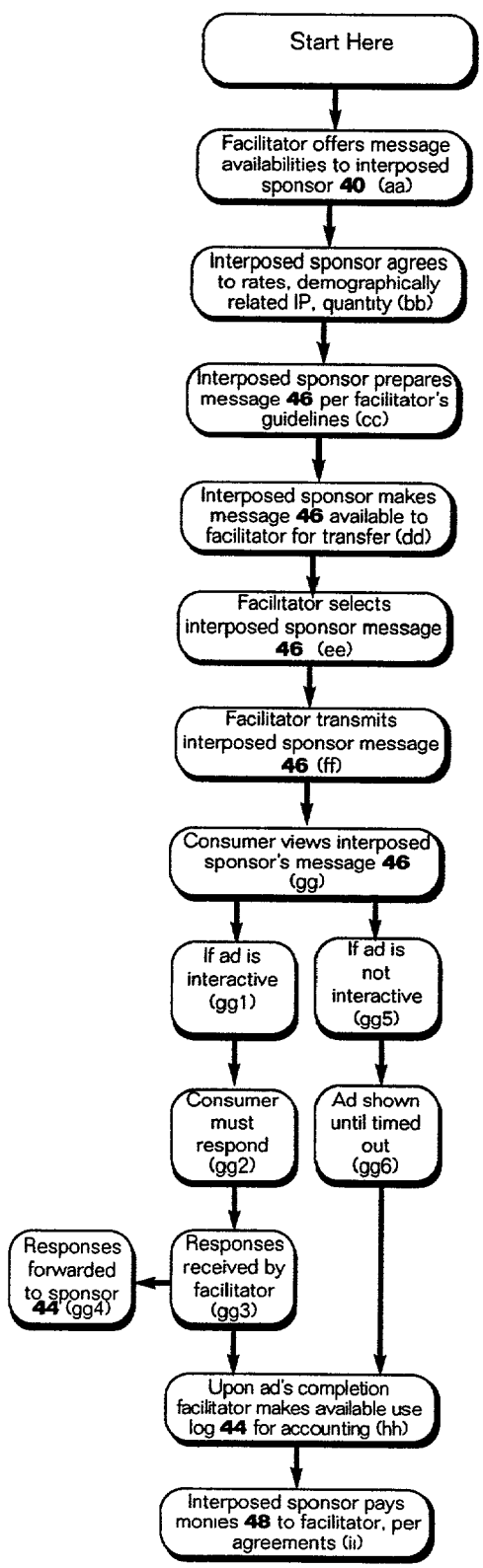
FIG. 3 shows a flow chart illustrating the method of obtaining/distributing intellectual property products of FIG. 1 from the interposed sponsor's perspective.

FIG. 3 describes the timeline for the interposed sponsor in accordance with the preferred embodiment of the present invention. At step (aa) facilitator offers message availability to interposed sponsor. At step (bb) facilitator and interposed sponsor enter into an agreement 42 specifying the fee 48 per exhibition of said message, which will be the source of the royalty 38 for the subsequently transferred IP 36. This agreement 42 may also specify which specific IP 36 and the number of its transaction cycles the interposed sponsor will contract for. In this way, interposed sponsor can "target" consumers most closely associated in demographic terms with said specific IP.

In step (cc) interposed sponsor prepares message per guidelines for the content of the message itself: its compatibility to run on said telecommunications network; its dimensions in pixels; its file size; its duration; the number of queries that preferably require responses from the consumer; consumer privacy issues; review and approval prior to use by facilitator. Interposed sponsor provides facilitator with access to the message (dd), by either making it available on interposed sponsor's computer 40A connected to said telecommunications network, or by sending a copy to reside at facilitator's site 10A.

At step (ee) facilitator matches up consumer's IP product choice with sponsor's message and transmits it to consumer. At (ff) through (gg6) consumer views sponsor's ad in same manner as described in FIG. 2, steps (v) through (v7). At step (hh) facilitator submits sponsor's use log 44 to sponsor as verification of messages exhibited prior to certain IP transfers. Finally, sponsor pays monies 48 to facilitator (ii), per agreement reached at step (bb).

Figure 4:
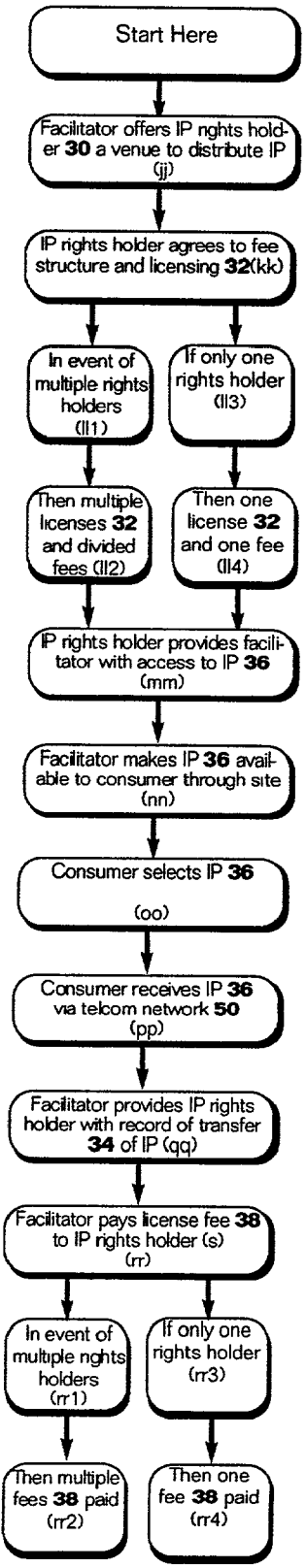
FIG. 4 shows a flow chart illustrating the method of distributing intellectual property products of FIG. 1 from the intellectual property rights holder's perspective.

FIG. 4 illustrates the step-by-step process between facilitator and intellectual property rights holder. At step (jj) facilitator offers its site as a venue for the distribution of IP rights holder's IP product. Facilitator and IP rights holder enter into a licensing agreement (kk) 32 specifying that royalties 38 will come from monies paid 48 from interposed sponsor 40. Facilitator will maintain use logs 34 to keep accurate records of the number of transaction cycles a specified IP product is a part of, the royalties due and subsequent payment. IP rights holder will be barred from playing the "consumer" in the transaction cycle, preventing IP rights holder from gaining profit at the expense of the interposed sponsor.

It is possible that one IP product has more than one rights holder. In recorded music, for instance, there can be the record company who claims copyright on the sound recording, and the songwriter and publisher who claim copyright on the composition. The songwriter and publisher are entitled to a statutory royalty enacted by Congress for each copy made from a mechanical license. Often the record company collects for all parties and distributes the funds per their own contracts between songwriter and publisher. Steps (ll1) through (ll4) address these issues.

At step (mm) IP rights holder provides facilitator access to IP products by either making it available on IP rights holder's computer 30A connected to said telecommunications network, or by sending a copy to reside at facilitator's site 10A. Quality control issues will be addressed at this time, where the best possible original source will be digitized in a manner most suited for distribution over a telecommunications network.

Facilitator then makes IP products available to consumer through listing at site (nn). Consumer selects IP products at step (oo), then preferably receives said IP through methods such as an FTP system (pp) (explained in greater detail back at FIG. 2, step (w)).

At step (qq) facilitator provides IP rights holder with use log 34, describing the number of times the IP product has been transferred. Facilitator then pays license fee 38 to IP rights holder (rr), (rr3) and (rr4); with special provisions for split payments to multiple rights holders if said IP has multiple rights holders (rr1) and (rr2).

While the above description contains many specific details, these should not be construed as limitations on the scope of the invention, but rather as an exemplification of one preferred embodiment thereof. Other variations are possible. For example, facilitator offers a "client application" to consumer, which acts as a browser, but with only one possible URL: that of the facilitator, ensuring better connectivity and possibly keeping consumer at facilitator's venue longer. Accordingly, the scope of the invention should be determined not by the preferred embodiment illustrated, but by the appended claims and their legal equivalents, as put forth hereinafter.

What I claim:

1. A method for distribution of products over the Internet via a facilitator, said method comprising the steps of:
   a first step of receiving, from a content provider, media products that are covered by intellectual-property rights protection and are available for purchase, wherein each said media product being comprised of at least one of text data, music data, and video data;
   a second step of selecting a sponsor message to be associated with the media product, said sponsor message being selected from a plurality of sponsor messages, said second step including accessing an activity log to verify that the total number of times which the sponsor message has been previously presented is less than the number of transaction cycles contracted by the sponsor of the sponsor message;
   a third step of providing the media product for sale at an Internet website;
   a fourth step of restricting general public access to said media product;
   a fifth step of offering to a consumer access to the media product without charge to the consumer on the precondition that the consumer views the sponsor message;
   a sixth step of receiving from the consumer a request to view the sponsor message, wherein the consumer submits said request in response to being offered access to the media product;
   a seventh step of, in response to receiving the request from the consumer, facilitating the display of a sponsor message to the consumer;
   an eighth step of, if the sponsor message is not an interactive message, allowing said consumer access to said media product after said step of facilitating the display of said sponsor message;
   a ninth step of, if the sponsor message is an interactive message, presenting at least one query to the consumer and allowing said consumer access to said media product after receiving a response to said at least one query;
   a tenth step of recording the transaction event to the activity log, said tenth step including updating the total number of times the sponsor message has been presented; and
   an eleventh step of receiving payment from the sponsor of the sponsor message displayed.

2. The method for distribution of products of claim 1, further comprising the step of paying royalties to the content provider.

3. The method for distribution of products of claim 1, further comprising the step of entering into a license agreement with the owner of the intellectual property rights associated with said media product.

4. The method for distribution of products of claim 1, further comprising the step of barring the content provider from pretending to be said consumer.

5. The method for distribution of products of claim 1, further comprising the step of tendering payment to the content provider by said facilitator.

6. The method for distribution of products of claim 1, further comprising the step of issuing to said consumer a password.

7. The method for distribution of products of claim 1, further comprising the step of verifying a submitted password.

8. A method for distribution of products over the Internet via a facilitator, said method comprising the steps of:
- a first step of providing a product list on an Internet website, wherein at least some of the products are media products covered by intellectual property rights protection and are available for purchase, said media products being provided by content providers, wherein each said media product is comprised of at least one of text data, sound data, and video data;
- a second step of selecting a sponsor message to be associated with at least one of said media products, said sponsor message being selected from a plurality of sponsor messages, said second step including accessing an activity log to verify that the total number of times which the sponsor message has been previously presented is less than the number of transaction cycles contracted by the sponsor of the sponsor message;
- a third step of restricting general public access to said media products;
- a fourth step of offering to a consumer access to a requested media product available for purchase without charge to the consumer on the precondition that the consumer views the sponsor message;
- a fifth step of receiving from the consumer a request to view a sponsor message in response to said step of offering;
- a sixth step of facilitating the display of a sponsor message to the consumer in response to receiving the request;
- a seventh step of, if the sponsor message is not an interactive message, allowing said consumer access to said requested media product after said step of facilitating the display of said sponsor message;
- an eighth step of, if the sponsor message is an interactive message, presenting at least one query to the consumer and allowing said consumer access to said media product after receiving a response to said at least one query;
- a ninth step of recording the transaction event to the activity log, said ninth step including updating the total number of times the sponsor message has been presented; and
- a tenth step of receiving payment from the sponsor of the sponsor message displayed.

9. The method for distribution of products of claim 8, further comprising the step of tendering payment to the content provider by said facilitator.

10. The method for distribution of products of claim 8, further comprising the step of issuing to said consumer a password.

11. The method for distribution of products of claim 8, further comprising the step of verifying a password submitted by said consumer.

12. The method for distribution of products of claim 8, further comprising the step of licensing from a content provider the right to distribute said media products.

13. The method for distribution of products of claim 8, further comprising the step of authoring a sponsor message.

14. The method for distribution of products of claim 8, further comprising the step of offering an advertiser the option to exhibit an advertisement message on said Internet web site.

15. The method for distribution of products of claim 8, further comprising the step of barring a content provider from pretending to be said consumer.

16. The method of claims 1 or 8, wherein the media product accessed by the consumer is downloaded to a memory of a personal computer of the consumer.

* * * * *